(12) United States Patent
Dequina

(10) Patent No.: US 7,888,925 B2
(45) Date of Patent: Feb. 15, 2011

(54) LOAD CURRENT COMPENSATION IN SYNCHRONOUS POWER CONVERTERS

(75) Inventor: Noel B. Dequina, Flemington, NJ (US)

(73) Assignee: Intersil Americas Inc., Milpitas, CA (US)

( * ) Notice: Subject to any disclaimer, the term of this patent is extended or adjusted under 35 U.S.C. 154(b) by 420 days.

(21) Appl. No.: 12/176,759

(22) Filed: Jul. 21, 2008

(65) Prior Publication Data

US 2009/0027024 A1    Jan. 29, 2009

Related U.S. Application Data

(60) Provisional application No. 60/951,261, filed on Jul. 23, 2007.

(51) Int. Cl.
*G05F 1/40* (2006.01)
(52) U.S. Cl. .................. 323/284; 323/229; 323/285
(58) Field of Classification Search ................. 323/222, 323/225, 229, 282, 284, 285, 290
See application file for complete search history.

(56) References Cited

U.S. PATENT DOCUMENTS

| | | |
|---|---|---|
| 4,298,835 A | 11/1981 | Rowe |
| 4,541,041 A | 9/1985 | Park et al. |
| 4,731,574 A | 3/1988 | Melbert |
| 4,809,150 A | 2/1989 | Limuti et al. |
| 4,814,684 A | 3/1989 | McCurdy |
| 5,481,178 A | 1/1996 | Wilcox et al. |
| 5,982,160 A | 11/1999 | Walters et al. |
| 5,994,885 A | 11/1999 | Wilcox et al. |
| 6,058,037 A | 5/2000 | Shibata et al. |
| 6,246,220 B1 | 6/2001 | Isham et al. |
| 6,396,250 B1 | 5/2002 | Bridge |
| 6,643,145 B1 | 11/2003 | Harrison |
| 6,812,677 B2 | 11/2004 | Walters et al. |
| 6,815,936 B2 | 11/2004 | Wiktor et al. |
| 6,861,826 B2 | 3/2005 | Lynch |
| 6,933,706 B2 | 8/2005 | Shih |
| 6,940,262 B2 | 9/2005 | Dequina et al. |

(Continued)

OTHER PUBLICATIONS

Baliga et al., "Paradigm Shift in Planar Power MOSFET Technology", "Power Electronic Technology", Nov. 2003, pp. 24-32, Publisher: Penton Media Inc.

(Continued)

*Primary Examiner*—Jessica Han
(74) *Attorney, Agent, or Firm*—Fogg & Powers LLC

(57) ABSTRACT

A method of operating a synchronous power converter generates a control signal in a load current compensation circuit based on a light load condition at the converter, where the control signal controls a gate driver for at least one power switch of the converter. When the gate driver is turned off via the control signal, the method monitors one or more comparison signals in a reference voltage adjustment module of the compensation circuit, a first comparison signal of the one or more comparison signals indicative of a voltage level at a phase node of the converter. Based on a remaining body diode conduction level associated a body diode with the at least one power switch as detected by at least a second comparison signal, the method adjusts a reference voltage for the at least one power switch with the adjustment module until the body diode is no longer conducting.

20 Claims, 6 Drawing Sheets

U.S. PATENT DOCUMENTS

| | | |
|---|---|---|
| 7,031,175 B2 | 4/2006 | Dequina |
| 7,098,640 B2 | 8/2006 | Brown |
| 7,161,332 B1 | 1/2007 | Kleine et al. |
| 7,508,175 B2 | 3/2009 | DeWitt et al. |
| 2004/0012346 A1 | 1/2004 | Green et al. |
| 2004/0041619 A1 | 3/2004 | Nadd |
| 2005/0128776 A1 | 6/2005 | Dequina et al. |
| 2005/0184714 A1 | 8/2005 | Rusu et al. |
| 2006/0017421 A1 | 1/2006 | Solie et al. |
| 2007/0069236 A1 | 3/2007 | Capodivacca et al. |
| 2009/0027020 A1* | 1/2009 | Qiu et al. .................. 323/282 |
| 2009/0027021 A1* | 1/2009 | Dequina .................. 323/282 |

OTHER PUBLICATIONS

"Synchronous Rectified MOSFET Driver (ISL6605)", "http://www.intersil.com/data/fn/fn9091.pdf", May 6, 2007, pp. 1-9, Publisher: Intersil Americas Inc.

Mappus, "Predictive Gate Drive Boosts Synchronous DC/DC Power Converter Efficiency", "Application Report—SLUA281", Apr. 2003, pp. 1-26, Publisher: Texas Instruments Inc.

"SI9150 Synchronous Buck Converter controller", "Objective Specification", Sep. 10, 1991, Publisher: Siliconix Inc.

"Si9150 Power Products", "Datasheet", , Publisher: Siliconix Inc.

International Searching Authority, "International Search Report", Dec. 3, 2008, Publilshed in : WO.

* cited by examiner

LOAD CURRENT COMPENSATION IN SYNCHRONOUS POWER CONVERTERS

CROSS REFERENCE TO RELATED APPLICATIONS

This application is related to commonly assigned U.S. patent application Ser. No. 12/116,092, filed on May 6, 2008 and entitled "THRESHOLD VOLTAGE MONITORING AND CONTROL IN SYNCHRONOUS POWER CONVERTERS" (the '092 application). The '092 application is incorporated herein by reference in its entirety.

This application claims the benefit of priority to U.S. Provisional Patent Application Ser. Nos. 60/951,259 and 60/951,261, each filed on Jul. 23, 2007, the disclosures of which are each incorporated herein by reference in their entirety.

BACKGROUND

Present electronic components require voltage regulation to successfully balance ("switch") output voltage positions based on changing levels in load currents. A conventional control scheme for switching voltage regulation is pulse width modulation (PWM). For example, a PWM controller will drive a set of upper and lower gate output power switches in a synchronous power converter providing the voltage regulation. Typically, the output power switches are Metal Oxide Semiconductor Field-Effect Transistors, or MOSFETs.

Conventional PWM controllers will use a constant switching frequency, but vary a duty cycle of the upper and lower gate output power switches as the load currents vary. These controllers generally achieve good regulation, low noise spectrum, and high power efficiency. However, when load currents are low, these controllers are known to be inefficient due to switching losses experienced at the upper and lower gates, along with a high quiescent current (that is, a high output current exists when no signal is applied to the input of the power converter). It is known that by adjusting a switching frequency to compensate for varying load current conditions, the power efficiency at light load levels can be improved.

For example, in at least one improved switching frequency arrangement, the synchronous power converter normally operates in a continuous conduction mode (CCM), and will automatically enter into a diode emulation mode (DEM) at lighter load conditions. In this same example, the synchronous power converter operates as a synchronous voltage rectifier in the CCM mode. In the DEM mode, at least a lower gate MOSFET power switch attempts to remain OFF to block any negative current flow.

However, even by operating in the DEM mode at the lighter load conditions, the power converter continues to experience conduction losses at one or more of the MOSFET power switches that further reduces system efficiency of the power converter. Accordingly, there is a need for improvements in load current compensation in synchronous power converters.

SUMMARY

The following specification provides for load current compensation in synchronous power converters. This summary is made by way of example and not by way of limitation. It is merely provided to aid the reader in understanding some aspects of at least one embodiment described in the following specification.

Particularly, in one embodiment, a method of operating a synchronous power converter generates a control signal in a load current compensation circuit based on a light load condition at the converter, where the control signal controls a gate driver for at least one power switch of the converter. When the gate driver is turned off via the control signal, the method monitors one or more comparison signals in a reference voltage adjustment module of the compensation circuit, a first comparison signal of the one or more comparison signals indicative of a voltage level at a phase node of the converter. Based on a remaining body diode conduction level associated a body diode with the at least one power switch as detected by at least a second comparison signal, the method adjusts a reference voltage for the at least one power switch with the adjustment module until the body diode is no longer conducting.

BRIEF DESCRIPTION OF THE DRAWINGS

These and other features, aspects, and advantages are better understood with regard to the following description, appended claims, and accompanying drawings where:

The various described features are drawn to emphasize features relevant to the embodiments disclosed. Like reference characters denote like elements throughout the figures and text of the specification.

DETAILED DESCRIPTION

Embodiments disclosed herein relate to load current compensation in synchronous power converters and switching voltage regulation systems. At least one embodiment is described below with reference to one or more example applications for illustration. It is understood that numerous specific details, relationships, and methods are set forth to provide a fuller understanding of the embodiments disclosed. Similarly, the operation of well-known components and processes has not been shown or described in detail below to avoid unnecessarily obscuring the details of the embodiments disclosed. For example, at least one embodiment relates to methods of correcting for turn-off errors in at least one power switch of the synchronous power converters discussed herein. In particular, a load current compensation circuit is provided for driving and monitoring operation of at least a lower gate output power switch under various implementations and load conditions for the synchronous power converters.

In at least one embodiment, the load current compensation circuit receives a low power mode signal (for example, a power supply control input, or PSI signal) to enable the load current compensation circuit to enter a low power mode, or a "light load" operation. Alternatively, when the low power mode signal is not provided by the load, similarly known methods of current sensing circuit technology are used to provide a signal representative of the output current to activate the load current compensation circuit.

The load current compensation discussed herein is based on monitoring a voltage level present at a phase node between a pair of lower and upper double-diffused metal oxide semiconductor (DMOS) power switches of the synchronous power converter. The synchronous power converter comprises an upper gate driver coupled to an upper gate of the upper DMOS power switch and a lower gate driver coupled to a lower gate of the lower DMOS power switch. An adjustable reference voltage from the load current compensation circuit corrects the turn-off error of the lower DMOS switch under light load operating conditions. The load current compensation circuit provides a control signal to turn off the lower DMOS switch when the synchronous power converter enters a diode emulation mode (DEM) and the phase node voltage rises above a zero reference level. In the DEM mode, the load current compensation circuit adjusts the reference voltage until body diode conduction of the lower DMOS switch stops and the lower DMOS switch is turned off. In one embodiment, a digital to analog converter (DAC) is used to precisely adjust the reference voltage in incremental voltage steps (for example, 500 µV) for every switching cycle until the body diode of the lower DMOS switch is no longer conducting.

Figure 1:
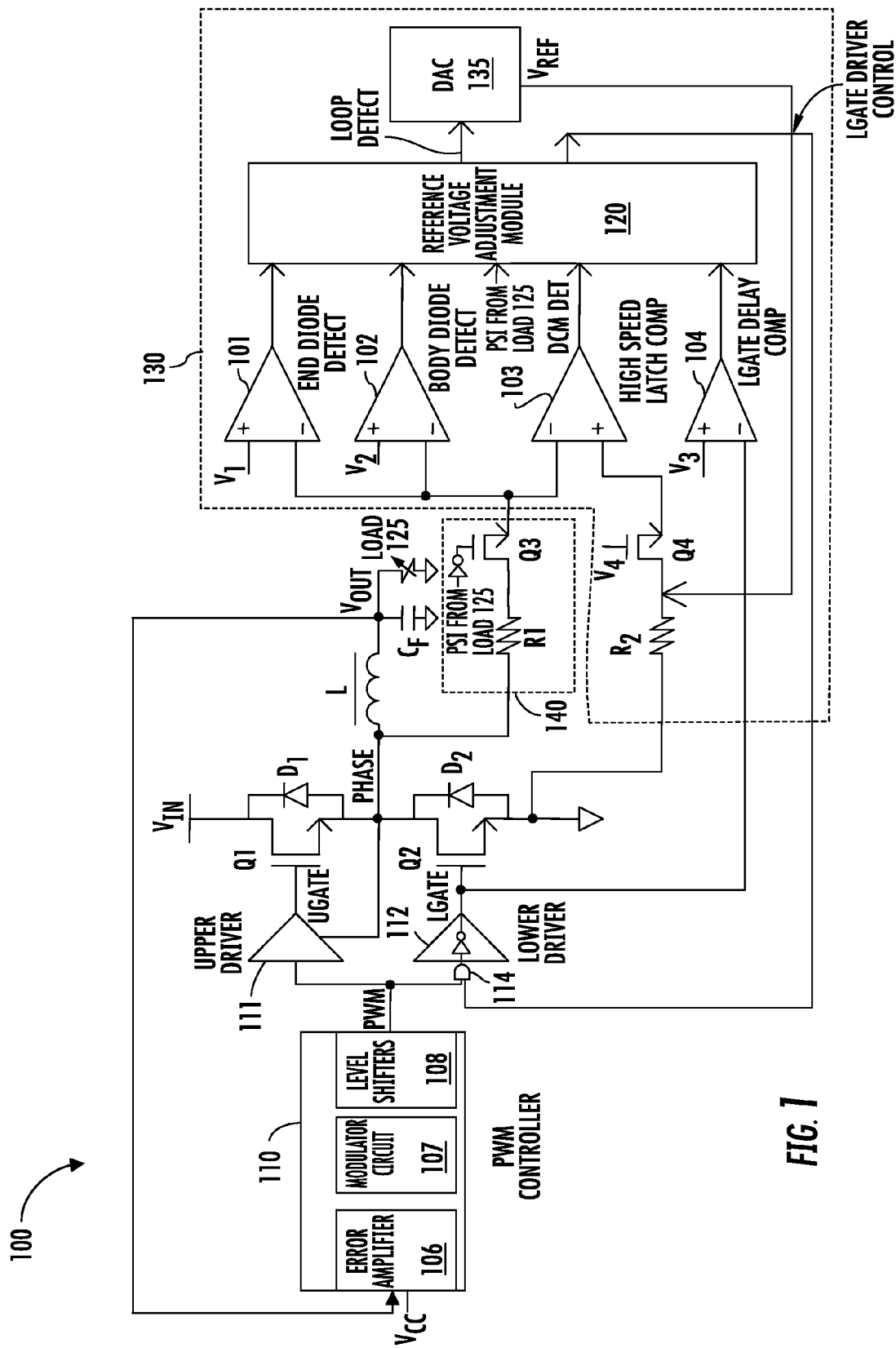
FIG. 1 is a schematic diagram of an embodiment of a synchronous power converter having a load current compensation circuit.

FIG. 1 is a schematic diagram of an embodiment of a synchronous power converter 100 having a load current compensation circuit 130. In the example embodiment of FIG. 1, the converter 100 further comprises a controller 110. In one implementation, the controller 110 is a multi-phase buck pulse width modulator (PWM) controller 110. In addition, although the converter 100 is shown as a single phase voltage regulation system, the converter 100 of FIG. 1 can be used with multi-phase systems, whether coupled or uncoupled, such as by employing an additional load current compensation circuit 130 per phase.

The controller 110 provides a driver control signal (indicated as PWM in FIG. 1) to drive upper and lower gate drivers 111 and 112. The upper and lower gate drivers 111 and 112 use the PWM driver control signal to drive relatively high currents into the upper and lower gates of n-DMOS output power switches Q1 and Q2. These currents are indicated in FIG. 1 as UGATE and LGATE, respectively. As shown in FIG. 1, the switches Q1 and Q2 further comprise body diodes D1 and D2, respectively. In the example embodiment of FIG. 1, the PWM driver signal is fed into a logic gate 114 prior to the lower gate driver 112. The logic gate 114 is further coupled to a digital output of the load current compensation circuit 130, as discussed in further detail below.

The controller 110, not shown in any particular detail, is well known in the art and typically comprises an error amplifier 106 with feedback components, a modulator circuit 107, and one or more level shifters 108. For example, a power supply input voltage $V_{CC}$ is applied to a non-inverting input of the error amplifier 106 with a feedback signal from $V_{OUT}$ coupled to the inverting input of the error amplifier 106. The output of the error amplifier 106 drives the PWM portion of the modulator circuit 107. The one or more level shifters 108 translate the resulting desired pulse widths into signal levels suitable for the upper and lower gate drivers 111 and 112, respectively.

The converter 100 provides a desired voltage output at a PHASE node, which is at a source of the power switch Q1 and a drain of the power switch Q2. During operation of the converter 100 under constant load current conditions, the output of the PHASE node switches between levels approaching $V_{IN}$ (when the switch Q1 is on) and ground, or 0V (when the switch Q2 is on). As further shown in FIG. 1, the voltage output at the PHASE node passes through a low pass filter circuit comprising an inductor L in series with a capacitor $C_F$ to become $V_{OUT}$ across a variable load 125. In one embodiment, the variable load 125 is a microprocessor, or the like, that generates a mode select signal. The mode select signal is used as an external triggering signal, which is generally in one of two states indicative of a load current. As discussed above, a feedback connection is shown from $V_{OUT}$ to the controller 110 to maintain the load current monitoring relationship between the output voltage $V_{OUT}$ and the load current.

The load current compensation circuit 130 comprises comparators 101, 102, 103, and 104 communicatively coupled to a reference voltage adjustment module 120. In one implementation, the reference voltage adjustment module 120 is a digital logic block that controls a reference voltage $V_{REF}$ suitable for use in adjusting the turn-off of the switch Q2 based on detectable changes in load currents, as discussed in further detail below. To adjust the reference voltage $V_{REF}$, the reference voltage adjustment module 120 provides a LOOP DETECT control signal to a digital to analog converter (DAC) 135. In the example embodiment of FIG. 1, the DAC 135 is a seven bit DAC having a least significant bit (LSB) resolution of 500 µV (for example, the DAC 135 increments the reference voltage by 500 µV for every switching cycle until the reference voltage adjustment module 120 is instructed to stop). It is understood that in alternate implementations of the load current compensation circuit 130, the DAC 135 is capable of providing alternate levels of resolution (for example, one to N bits of resolution).

The comparators 101, 102, and 103 are coupled to the PHASE node via a low power detection circuit 140. In one embodiment, the low power detection circuit 140 is a low power signal module 140 comprising a low power load resistor R1 and a power supply control input (PSI) switch Q3 (shown as a NMOS transistor in FIG. 1). The converter 100 further comprises a lower gate offset resistor R2 and an offset switch Q4 (also shown as a NMOS transistor in FIG. 1) coupled to an input of the comparator 103. The offset switch Q4 receives a voltage input $V_4$ to maintain a zero reference level for at least one input of the comparator 103, as discussed in further detail below.

In the example embodiment of FIG. 1, the variable load 125 issues a mode select signal to the reference voltage adjustment module 120 as part of the load current compensation operation discussed below. This mode select signal, shown as a PSI signal from the variable load 125, turns on the PSI switch Q3 when the variable load 125 is in a light load condition. In one embodiment, when the variable load 125 senses the load current being "heavy," the variable load 125 sets the PSI signal to a logical "1" state. Similarly, when the variable load 125 senses the load current being "light," such as below a predetermined current threshold set on the variable load 125, the variable load 125 sets the PSI signal to a logical "0" state. In one implementation, the low power detection circuit 140 turns the switch Q3 ON when the mode select signal equals zero using an inverter as shown in FIG. 1.

In operation, the load current compensation circuit 130 monitors and corrects for a turn-off error of the switch Q2 during detectable changes in load current. As discussed in further detail below with respect to FIGS. 3A to 4E, the load current compensation circuit 130 detects the presence of positive inductor current $I_{IND}$ (which results from body diode conduction of the body diode D2) as an indication of changes in the load current. In one implementation, the reference voltage adjustment module 120 provides an adjustable reference voltage $V_{REF}$ at the source of the switch Q2 to correct the turn-off error under the light load condition indicated by the PSI signal from the variable load 125. In particular, the reference voltage adjustment module 120 adjusts the reference voltage $V_{REF}$ until the body diode D2 remains off for at least two consecutive PWM operating cycles, as discussed in further detail below with respect to FIGS. 3A to 3F. The reference voltage adjustment module 120 processes incoming signals from the comparators 101 to 104 to adjust the reference voltage $V_{REF}$, as discussed in further detail below.

The comparator 101, shown as an "END DIODE DETECT" in FIG. 1, functions as a diode detection comparator 101. The diode detection comparator 101 compares the PHASE node voltage against a first fixed voltage $V_1$ (for example, 0.8 V). When the voltage level at the PHASE node reaches the first fixed voltage $V_1$, the output of the diode detection comparator 101 indicates to the reference voltage adjustment module 120 to terminate sensing of the body diode D2 and suspend any further adjustments of the reference voltage $V_{REF}$ since the body diode D2 is no longer conducting. For example, if the voltage level at the PHASE node reaches the first fixed voltage $V_1$, the load current compensation circuit 130 does not continue to increment the reference voltage $V_{REF}$.

The comparator 102, shown as a "BODY DIODE DETECT" in FIG. 1, functions as a body diode detector. The output of the comparator 102 serves as a conduction detection signal for the body diode D2 of the switch Q2. In one implementation, to detect the body diode conduction level of the body diode D2, the comparator 102 compares the PHASE node voltage with a fixed voltage level $V_2$ (for example, −0.3 V).

The comparator 103, shown as a "HIGH SPEED LATCH COMP" in FIG. 1, functions as a precision high-speed latch comparator. During light load conditions, the latch comparator 103 compares the PHASE node voltage level with a zero reference level provided from the offset switch Q4. The comparator 104, shown as "LGATE DELAY COMP" in FIG. 1, functions as an LGATE comparator. The LGATE comparator 104 compares the LGATE voltage level against at least a third fixed voltage level $V_3$ (for example, 1.75 V) until the LGATE voltage level equals $V_3$. In one implementation, a comparison time for the LGATE comparator 104 equals a conduction time delay (for example, 350 ns) based on a predetermined conduction time of the body diode of the lower switch Q2 during light load conditions.

As discussed in further detail below, the latch comparator 103 begins comparing the PHASE node voltage with the reference voltage $V_{REF}$ once the comparator 104 indicates that the LGATE voltage equals $V_3$. As shown in FIG. 1, the output of the latch comparator 103 is a "DCM DET" signal for the reference voltage adjustment module 120. The DCM DET signal indicates a rising PHASE node voltage with respect to the zero reference level.

When the PSI signal indicates the variable load 125 is experiencing a light load condition, the converter 100 automatically enters a diode conduction mode (DCM). In the DCM mode, the PHASE node voltage rises above the zero reference level when the inductor current $I_{IND}$ is in a period of negative (inverted) current below a zero threshold level for the inductor current $I_{IND}$. The latch comparator 103 compares the PHASE node voltage level against the zero reference level once the LGATE comparator 104 provides an indication that the LGATE voltage is equal to the third fixed voltage level $V_3$ after the conduction time delay discussed above. As discussed below with respect to FIGS. 3A to 3F, the output of the latch comparator 103 provides the DCM DET signal to the reference voltage adjustment module 120 once the PHASE node voltage begins to rise above the zero reference level. With the PSI signal indicating the light load condition and the DCM DET signal at a logic high level, the reference voltage adjustment module 120 provides an LGATE DRIVER CONTROL signal to instruct the lower gate driver 112 (through the logic gate 114) to turn off the switch Q2.

At substantially the same time, the body diode comparator 102 begins to monitor the body diode conduction level of the body diode D2. As the body diode conduction level decreases and the PHASE node voltage drops below the zero reference level, the output of the body diode comparator 102 informs the reference voltage adjustment module 120 to issue the LOOP DETECT signal, as further discussed below with respect to FIG. 2. The LOOP DETECT signal indicates to the DAC 135 to adjust the reference voltage $V_{REF}$ by the at least one predetermined voltage step (for example, 500 μV) until the body diode D2 is no longer conducting. Since the PWM controller 110 continues to issue PWM pulses after the body diode D2 is no longer conducting, the diode detection comparator 101 provides an output to indicate to the reference voltage adjustment module 120 to terminate the LOOP DETECT signal if the PHASE node voltage reaches the first fixed voltage $V_1$ at the diode detection comparator 101.

In one implementation, the reference voltage adjustment module 120 further stabilizes the DAC 135, allowing the reference voltage $V_{REF}$ to remain at a near constant voltage level. In one embodiment, the latch comparator 103 uses the reference voltage $V_{REF}$ during an entire low power input mode (for example, while a PSI signal is active during light load conditions) as indicated by the variable load 125. In this same implementation, as soon as the variable load 125 provides a notification to terminate the low power input mode using the PSI signal, all previously stored references are reset to default values.

Figure 2:
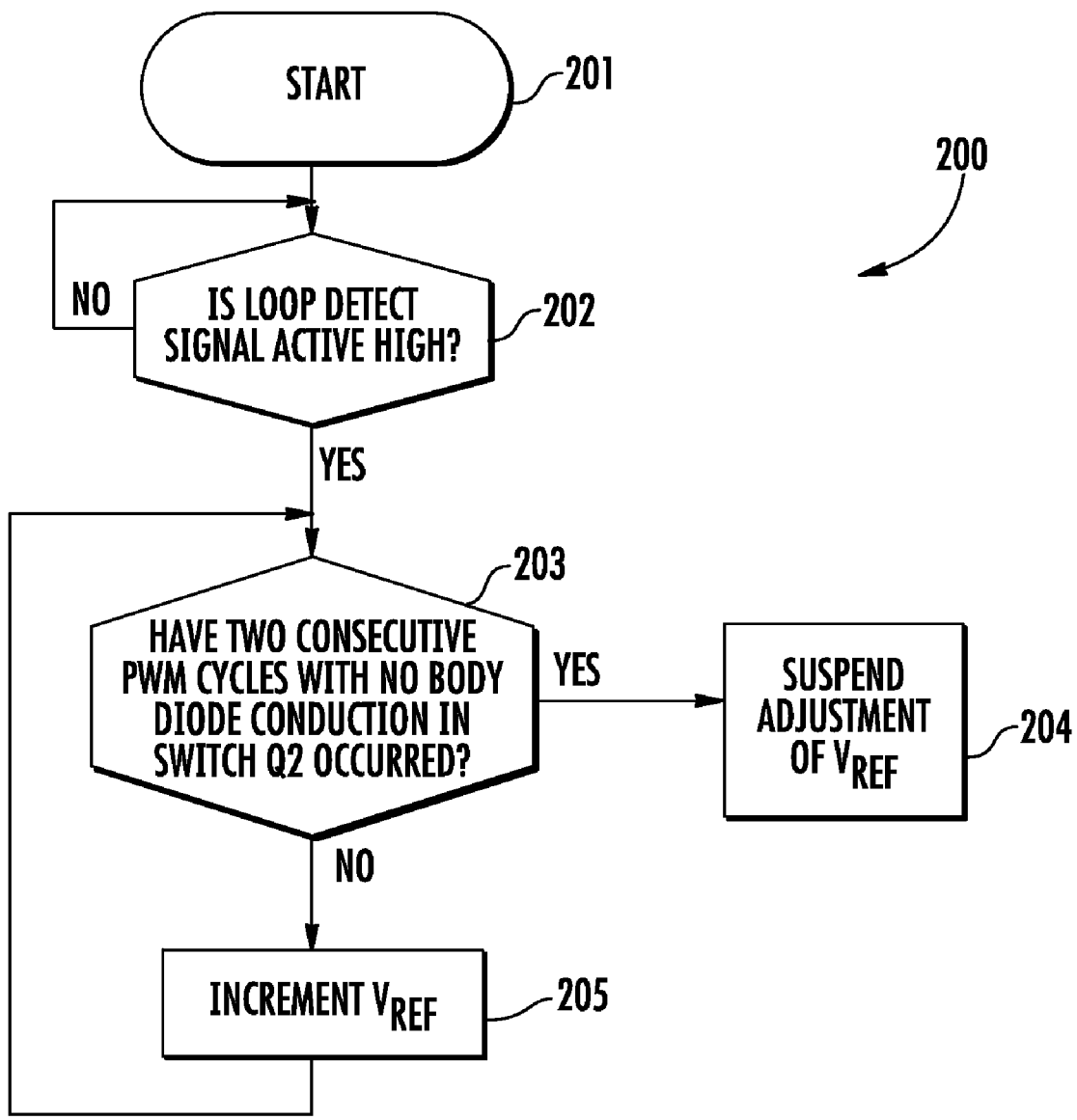
FIG. 2 is a flow diagram of an embodiment of adjusting a reference voltage in the load current compensation circuit of FIG. 1.
Figure 3:
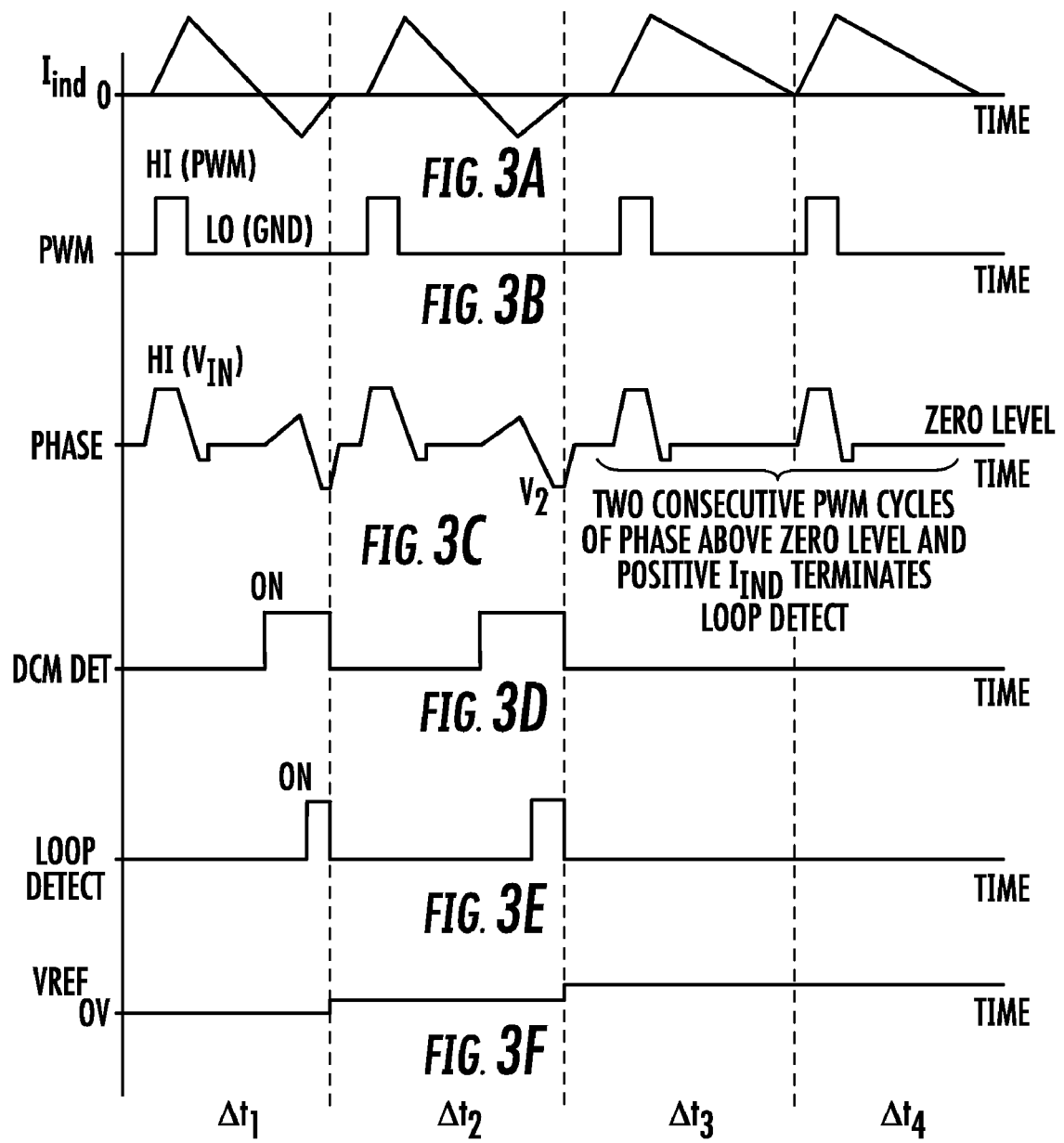
FIGS. 3A to 3F are timing diagrams of inductor load current and input voltage and reference voltage levels after at least two operating cycles in an embodiment of a synchronous power converter.
Figure 4:
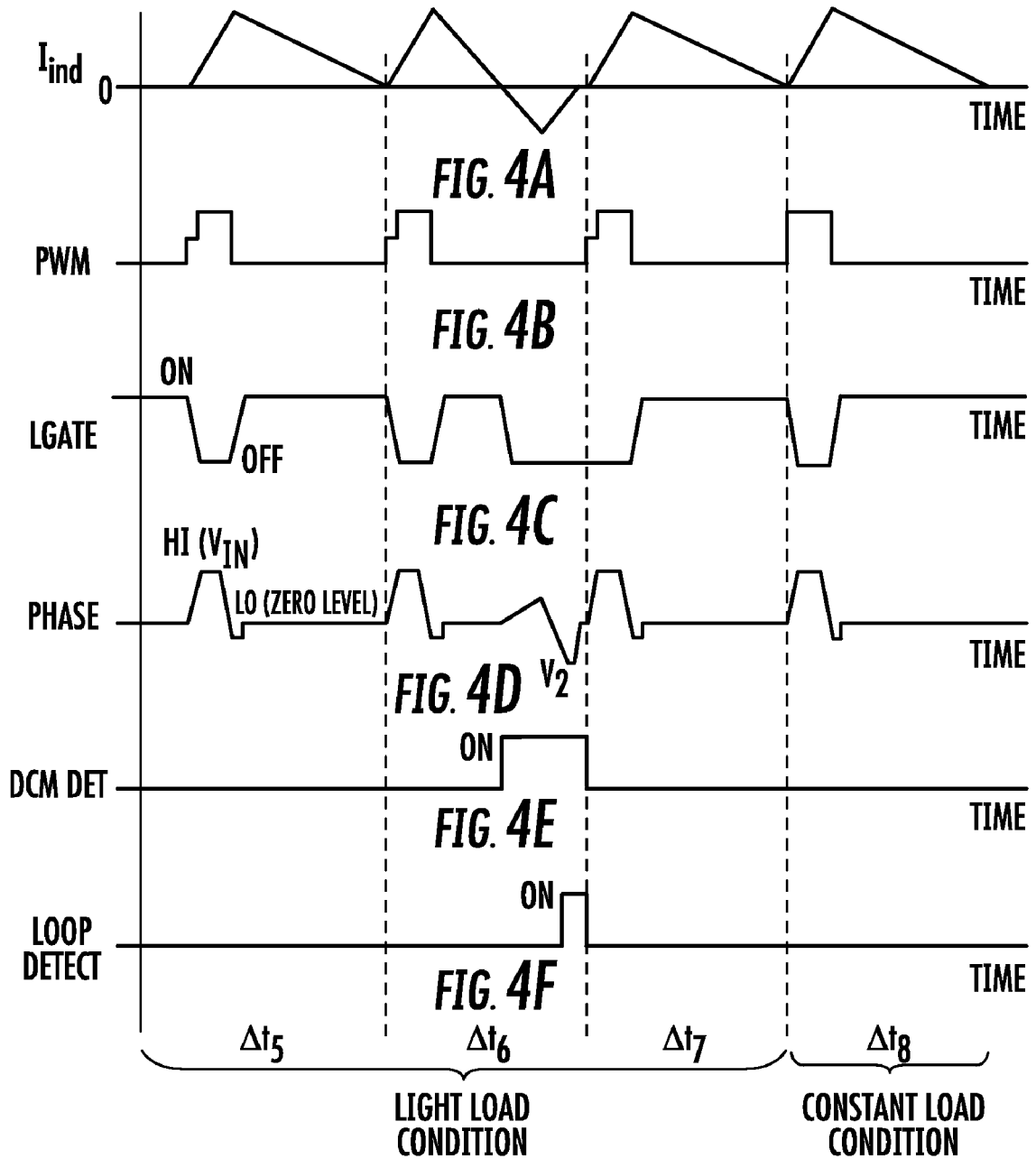
FIGS. 4A to 4F are timing diagrams of inductor load current and input voltage and reference voltage levels after at least two operating cycles in an embodiment of a synchronous power converter under various load conditions.

FIG. 2 is a flow diagram of an embodiment of adjusting the reference voltage using the reference voltage adjustment module 120 of the load current compensation circuit 130 of FIG. 1. Once the LOOP DETECT signal from the reference voltage adjustment module 120 transitions to a logic HIGH (block 202), the DAC 135 incrementally adjusts the reference voltage $V_{REF}$ for the latch comparator 103 as long as the body diode comparator 102 continues to detect the body diode conduction of the body diode D2 associated with the switch Q2. Once the body diode detector 102 does not detect the body diode D2 conducting for at least two consecutive PWM cycles (block 203), the reference voltage adjustment module 120 suspends the adjustment of the reference voltage $V_{REF}$ (block 204). This suspended reference voltage is stored in the reference voltage adjustment module 120. While the body diode detector 102 continues to detect the body diode D2 conducting, the reference voltage adjustment module 120 instructs the DAC 135 to increase the reference voltage $V_{REF}$ by at least one predetermined voltage step every PWM cycle (block 205).

The simulated timing of a process performed by the correction circuit 130 for a single phase synchronous power converter 100 is described below with respect to FIGS. 3A to 4E. It is understood that the example embodiments described below with respect to FIGS. 3A to 4E are provided for illustrative purposes only and do not in any way define or limit the scope of the embodiments disclosed. For example, one or more of the disclosed embodiments can be applied to a variety of voltage regulators and power converters, including multiphase converters, single channel MOSFET drivers, and integrated driver controllers. For example, the mode select signal can also be generated by another system power management controller, or by the controller 110 (for example, by sensing the load current through the feedback loop shown in FIG. 1). In the case of a multi-phase converter 100, an associated multi-phase modulation controller will start dropping phases during light load operations and leave at least one of the phases operating in a diode emulation mode (DEM).

FIGS. 3A to 3F are timing diagrams of inductor load current and input voltage and reference voltage levels after at least four PWM operating cycles of the converter 100 of FIG. 1. The timing diagrams of FIGS. 3A to 3F are illustrative examples of operating the converter 100 with the mode select signal from the variable load 125 of FIG. 1 indicating a light load condition. For purposes of illustration, the operating cycles are shown in FIGS. 3A to 3F as PWM operating cycle periods $\Delta t_1$ to $\Delta t_4$.

The inductor current $I_{IND}$ in FIG. 3A is seen to rise in cycle period $\Delta t_1$, when a PWM output pulse has a "LO to HI" transition in FIG. 3B. Similarly, $I_{IND}$ decreases linearly during a "HI to LO" transition of the PWM output pulse for the remainder of the cycle period $\Delta t_1$. In cycle period $\Delta t_2$, and at the trailing edge of the PWM pulse, the PWM controller 110 signals $I_{IND}$ to fall rapidly, causing the PHASE node voltage in FIG. 3C to rise above GROUND once $I_{IND}$ crosses the zero point as a negative value.

In one implementation, during the light load operating condition, the PHASE node voltage shown in FIG. 3C is compared to a GROUND voltage level of 0 V after every PWM pulse of the converter 100 at cycle periods $\Delta t_1$ and $\Delta t_2$. As shown in FIG. 3D, once the latch comparator 103 of FIG. 1 detects when the PHASE voltage rises above the GROUND voltage level, a DCM DET output signal from the latch comparator 103 transitions to an active HIGH at the zero crossing point of $I_{IND}$. The DCM DET signal indicates to the reference voltage adjustment module 120 that the converter 100 is in a diode conduction mode (DCM) when the switch Q2 is off. Moreover, as shown in FIG. 3E, the reference voltage adjustment module 120 issues the LOOP DETECT signal once the PHASE node voltage drops below zero volts when the DCM DET signal is in the active HIGH state. As shown in FIG. 3C, the PHASE node voltage does not decrease below the voltage level $V_2$ while the body diode D2 continues to conduct when the switch Q2 is off. As discussed above with respect to FIG. 2, the LOOP DETECT signal instructs the DAC 135 to increment the reference voltage $V_{REF}$ by at least one predetermined voltage step.

FIG. 3F shows the reference voltage $V_{REF}$, corresponding to a starting voltage level (for example, 0V) in cycle period $\Delta t_1$ plus the incremental voltage added by the DAC 135 during each PWM cycle period $\Delta t_2$ to $\Delta t_4$. As shown in FIG. 3F, the reference voltage $V_{REF}$ increments following each LOOP DETECT signal pulse in FIG. 3E. When the PHASE voltage remains above the GROUND voltage level (as shown in FIG. 3B on the third PWM cycle period $\Delta t_3$ and following), the DCM DET signal remains LOW and the DAC 135 suspends incrementing $V_{REF}$. The LOOP DETECT signal terminates when two consecutive DCM DET signals stay at the logic LOW level. As discussed above with respect to the description of FIG. 3A, after two consecutive PWM cycles of the PHASE voltage greater than 0 V and positive inductor current $I_{IND}$, the reference voltage adjustment module 120 terminates the LOOP DETECT signal. The converter 100 uses the adjusted reference voltage $V_{REF}$ at the lower power switch for the duration of the light load condition.

FIGS. 4A to 4F are timing diagrams of inductor load current and input voltage and reference voltage levels after at least four PWM operating cycles of the converter 100 of FIG. 1. The timing diagrams of FIGS. 4A to 4F are illustrative examples of operating the converter 100 with the mode select signal from the variable load 125 of FIG. 1 indicating various conditions of inductor load current $I_{IND}$. For purposes of illustration, the operating cycles are shown in FIGS. 4A to 4F as PWM operating cycle periods $\Delta t_5$ to $\Delta t_8$.

The inductor current $I_{IND}$ in FIG. 4A is seen to rise in cycle period $\Delta t_5$ when a PWM output pulse has a "LO to HI" transition in FIG. 4B. Similarly, $I_{IND}$ decreases linearly during a "HI to LO" transition of the PWM output pulse for the remainder of the cycle period $\Delta t_5$. FIG. 4B illustrates a PWM output pulse transition in cycle period $\Delta t_5$ when the mode select signal is set to a logic '1' (indicated by the "notch" in the logic state of the PWM output pulse shown in FIG. 4B), indicative of a light load operation condition. With the mode select signal indicative of the light load operation, the LGATE signal output goes low (OFF) as shown in FIG. 4C due to the converter 100 operating in the diode emulation mode (DEM).

For illustrative purposes, the timing diagrams for the converter 100 in the cycle period $\Delta t_5$ indicates the converter 100 operating under light load conditions prior to the load current compensation circuit 130 in operation. As a result, the PHASE node voltage of FIG. 4D transitions from LO to HI and remains in-phase with the PWM output pulse, while the LGATE driver output in FIG. 4C has an out-of-phase transition from ON to OFF and back to ON, an indication of turn-off error as described above.

In cycle period $\Delta t_6$, and at the trailing edge of the PWM pulse, the PWM controller 110 signals $I_{IND}$ to fall rapidly, causing the PHASE node voltage in FIG. 4D to rise above a zero reference level once $I_{IND}$ crosses the zero point as a negative value. As discussed above with respect to FIG. 1, and as shown in FIG. 4E, the rise in the PHASE node voltage above the zero reference level causes the output of the latch comparator 103 of FIG. 1 to issue an active high DCM DET signal to the reference voltage adjustment module 120, indicating that the converter 100 is now in a diode conduction mode (DCM). The reference voltage adjustment module 120 issues an LGATE DRIVER CONTROL signal to the lower gate driver 112 (through the logic gate 114) to turn off the switch Q2 as shown by the LGATE signal in FIG. 4C in cycle period $\Delta t_6$. In addition, while the switch Q2 remains off as the body diode conduction level decreases, the PHASE node voltage drops below 0 V as shown in FIG. 4D. As a result, the output of the body diode comparator 102 informs the reference voltage adjustment module 120 to activate the LOOP DETECT signal (FIG. 4F) and begin incrementing the reference voltage $V_{REF}$ as described above with respect to FIGS. 3A to 3F.

In cycle period $\Delta t_7$, FIG. 4B illustrates the PWM output pulse transition with the mode select signal continuing to indicate the light load operating condition. In this exemplary cycle period $\Delta t_7$, the LGATE signal output remains LOW due to the load current compensation circuit 130 and the adjustment of the voltage reference $V_{REF}$ to correct for the turn-off error of the switch Q2 of FIG. 1 during the light load operating condition changes in load current. In cycle period $\Delta t_8$, with the mode select signal set to a logic '0', the PWM output pulse of FIG. 4B is shown without the PWM output pulse transition "notch" to indicate a constant load condition. The LGATE driver output transitions to ON as shown in FIG. 4C, and the PHASE node voltage remains at the zero reference level as shown in FIG. 4D.

Figure 5:
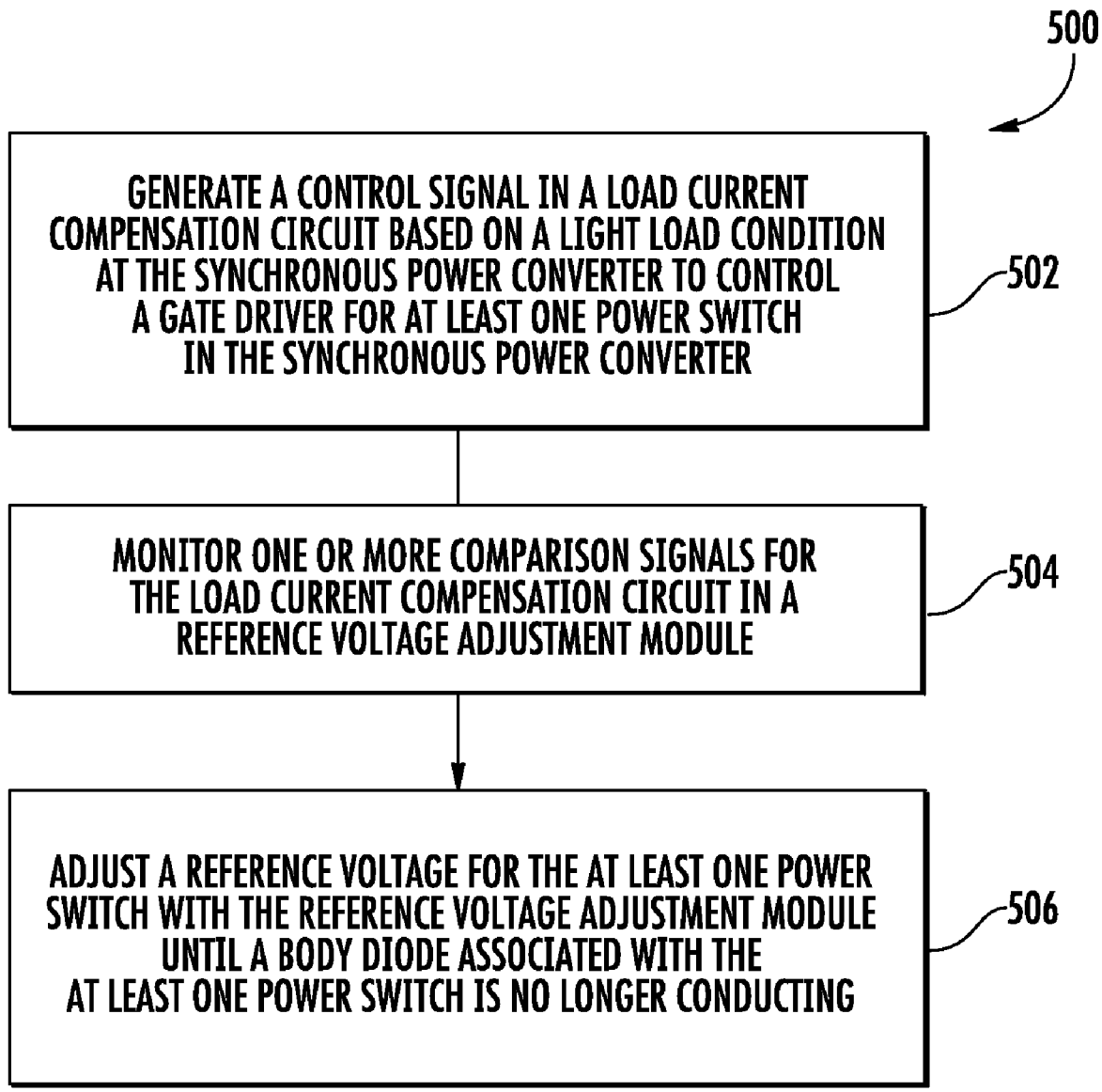
FIG. 5 is a flow diagram of an embodiment of a method of operating a synchronous power converter.

FIG. 5 is a flow diagram of an embodiment of a method 500 of operating a synchronous power converter. For example, the method 500 addresses correcting for turn-off errors in at least one power switch of the synchronous power converter 100 of FIG. 1. In one embodiment, the synchronous power converter uses an adjusted reference voltage at the source of a lower power switch of the synchronous power converter during light load conditions.

In the method of FIG. 5, a load current compensation circuit coupled to the synchronous power converter generates a control signal based on a light load condition at the synchronous power converter (block 502). When the at least one power switch is turned off via the control signal of the load current compensation circuit, the load current compensation circuit monitors one or more comparison signals in a reference voltage adjustment module (block 504). In the method of FIG. 5, a first comparison signal of the one or more comparison signals is indicative of a voltage level at a phase node of the synchronous power converter. Based on a remaining body diode conduction level associated with the at least one power switch as detected by at least a second comparison signal, the load current compensation circuit incrementally adjusts the reference voltage for the at least one power switch with the reference voltage adjustment module until the body diode associated with the at least one power switch is no longer conducting (block 506).

In one implementation, the load current compensation circuit detects an increase in the phase node voltage based on the body diode conduction level after a predetermined conduction time delay. Once the phase node voltage increases above zero volts, the load current compensation circuit receives an indication from a signal comparator that instructs the reference voltage adjustment module to begin the adjustment of the reference voltage for the at least one power switch.

The load current compensation circuit increments the reference voltage by at least one preconfigured voltage step following an adjustment signal (for example, a loop detect pulse instruction) from the reference voltage adjustment module. In this implementation, the reference voltage adjustment module issues the adjustment signal for every operating cycle when the voltage level at the phase node increases above the zero reference level at a zero threshold crossing point of the inductor current. The load current compensation circuit suspends adjustment of the reference voltage after at least two consecutive operating cycles of positive inductor current where the voltage level at the phase node is above the zero reference level following the at least one preconfigured voltage step increment of the reference voltage.

Figure 6:
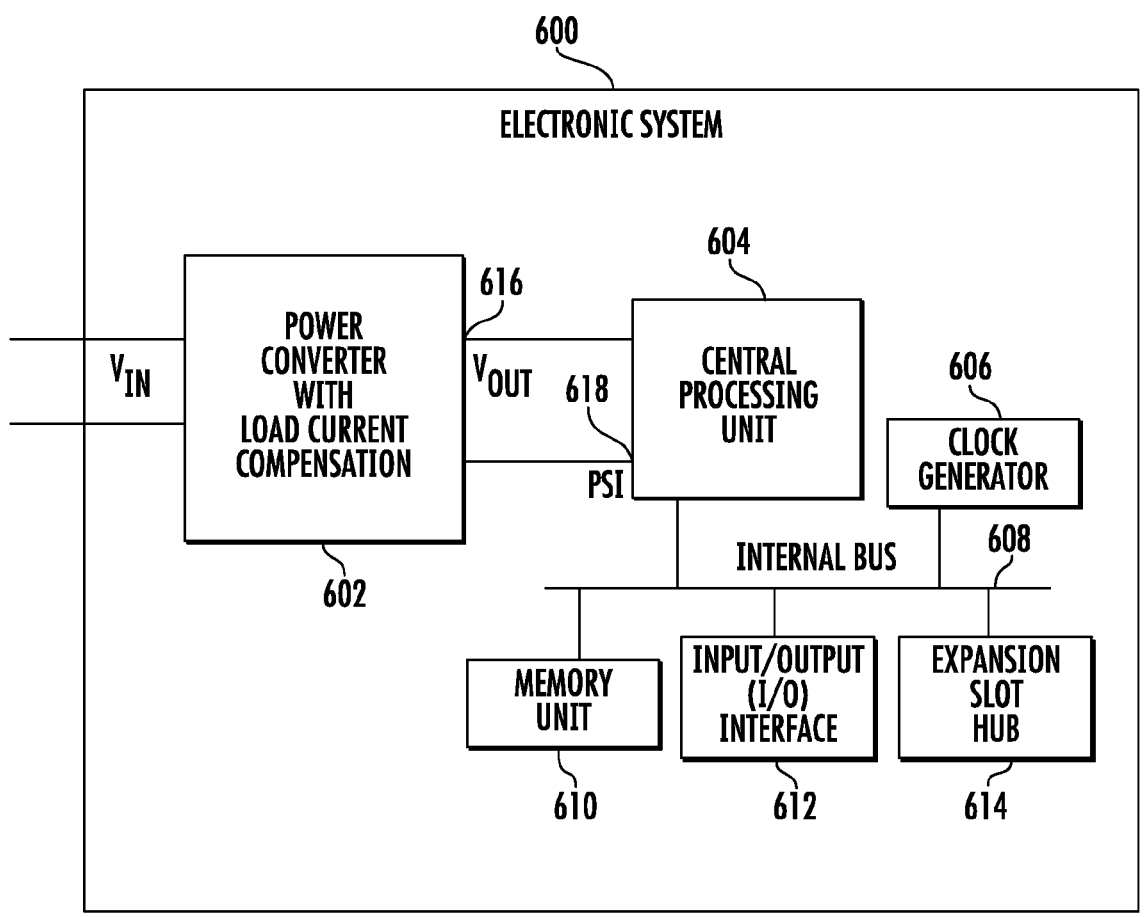
FIG. 6 is a block diagram of an exemplary embodiment of an electronic system having a synchronous power converter with load current compensation.

FIG. 6 is a block diagram of an exemplary embodiment of an electronic system, indicated generally at 600, having a synchronous power converter with load current compensation 602 similar to the synchronous power converter 100 of FIG. 1. The synchronous power converter 602 is coupled to a central processing unit 604. Examples of the central processing unit 604 include any type of microprocessor or microcontroller such as but not limited to, computer motherboards, systems, and displays operating with variable load current. The electronic system 600 further comprises a clock generator 606, a memory unit 610, an input/output (I/O) interface (612), and an expansion slot hub 614, each of which are communicatively coupled to the central processing unit 604 via an internal bus 608.

As illustrated, the synchronous power converter 602 takes a voltage input $V_{IN}$ and provides a $V_{OUT}$ to the central processing unit 604 at an output node 616. In particular, the synchronous power converter 602 operates under various implementations and load conditions of the microprocessor 604. For example, in the embodiment of FIG. 6, the synchronous power converter 602 enters a "low power" mode based on a mode select signal 618 (for example, a PSI signal) from the varying load device 604.

This description has been presented for purposes of illustration, and is not intended to be exhaustive or limited to the embodiments disclosed. Variations and modifications may occur, which fall within the scope of the following claims. For example, some of the components described above may be implemented using either digital or analog circuitry, or a combination of both, and, where appropriate, realized through software executing on suitable processing circuitry and machine-readable storage mediums. The embodiments described can be used in a variety of circuits, including power MOSFET drivers and integrated driver/output switches, as well as related voltage regulation systems. Moreover, computing and switching mode power supply systems will benefit from the described embodiments.

What is claimed is:

1. A method of operating a synchronous power converter, the method comprising:
   generating a control signal in a load current compensation circuit coupled to a synchronous power converter based on a light load condition at the synchronous power converter, the control signal operable to control a gate driver for at least one power switch of the synchronous power converter; and
   when the gate driver is turned off via the control signal of the load current compensation circuit,
      monitoring one or more comparison signals in a reference voltage adjustment module of the load current compensation circuit, a first comparison signal of the one or more comparison signals indicative of a voltage level at a phase node of the synchronous power converter, and
      based on a remaining body diode conduction level associated with a body diode for the at least one power switch as detected by at least a second comparison signal of the one or more comparison signals, adjusting a reference voltage for the at least one power switch with the reference voltage adjustment module until the body diode is no longer conducting.

2. The method of claim 1, further comprising:
   using the adjusted reference voltage at the source of the at least one power switch of the synchronous power converter during the light load condition.

3. The method of claim 1, wherein generating the control signal in the load current compensation circuit further comprises:
   providing a mode select signal as the control signal from a variable load element coupled to a voltage output of the synchronous power converter.

4. The method of claim 1, wherein monitoring the one or more comparison signals in the load current compensation circuit coupled to the synchronous power converter comprises:
   detecting an increase in the phase node voltage based on the body diode conduction level after a predetermined conduction time delay; and
   once the phase node voltage increases above a zero reference level, receiving an indication from a signal comparator that instructs the reference voltage adjustment module to begin the adjustment of the reference voltage for the at least one power switch.

5. The method of claim 1, wherein adjusting the reference voltage comprises:
   incrementing the reference voltage by at least one preconfigured voltage step following an adjustment signal from the reference voltage adjustment module, the reference voltage adjustment module issuing the adjustment signal for every operating cycle when the voltage level at the phase node increases above the zero reference level at a zero crossing point of the inductor current; and suspending adjustment of the reference voltage after at least two consecutive operating cycles of positive inductor current and the voltage level at the phase node above the zero reference level following the at least one preconfigured voltage step increment of the reference voltage.

6. A load current compensation circuit for a synchronous power converter, comprising:

at least one comparator having a first input coupled to a phase node between upper and lower power switches of a synchronous power converter and a second input configured at a zero level, the at least one comparator operable to compare a voltage level at the phase node with the zero reference level; and a reference voltage adjustment module, coupled to an output of the at least one comparator for processing signals from the at least one comparator, the reference voltage adjustment module operable to receive an indication of load current levels of a synchronous power converter from a mode select signal, and provide a control signal to control a gate driver for at least one of the power switches in a light load current condition as the voltage level at the phase node increases from the zero reference level during a zero threshold crossing point of inductor current for the synchronous power converter;

wherein, when a body diode of the at least one power switch continues to conduct after the gate driver for the at least one power switch is turned off, the reference voltage adjustment module is operable to incrementally adjust a reference voltage level for the at least one power switch until the body diode conduction of the at least one power switch is no longer conducting.

7. The circuit of claim 6, further comprising:
a low power signal module configured to monitor load currents of a variable load element and responsive to the mode select signal, the low power signal level operable to activate the load current compensation circuit based on the light load current condition.

8. The circuit of claim 6 and further comprising:
a digital to analog converter operable to receive an adjustment signal from the reference voltage adjustment module, wherein the adjustment signal instructs the digital to analog converter to incrementally adjust the reference voltage for every operating cycle of the synchronous power converter where the inductor current crosses below a negative threshold level for the inductor current and the phase node voltage level increases from the zero reference level.

9. The circuit of claim 6 and further comprising:
a body diode comparator operable to provide an output to the reference voltage adjustment module, the body diode comparator having a first input coupled to receive the phase node voltage level, wherein the body diode comparator is operable to monitor the body diode associated with the at least one power switch.

10. The circuit of claim 9, wherein the body diode comparator has a second input coupled to receive a second fixed voltage level, the second fixed voltage level compared against the phase node voltage level in detecting the body diode conduction level of the lower power switch.

11. The circuit of claim 6 and further comprising:
a diode detection comparator operable to provide an output to the reference voltage adjustment module, the diode detection comparator having a first input coupled to receive a signal representative of a first fixed voltage level and a second input coupled to receive the phase node voltage level, the output of the diode detection comparator operable to indicate to the reference voltage adjustment module to terminate sensing of the body diode of the at least one power switch and suspend any further adjustments of the reference voltage if the phase node voltage level reaches the first fixed voltage level.

12. The circuit of claim 6 and further comprising:
a lower gate delay comparator operable to provide an output to the reference voltage adjustment module, the lower gate delay comparator having a first input coupled to receive at least a third fixed voltage level and a second input coupled to receive an output voltage level of the lower power switch, the lower gate delay comparator configured to compare the output voltage level of the lower gate power switch against the third fixed voltage level based on a predetermined conduction time delay for the body diode of the lower power switch after the turning off of the lower gate driver during the light load conditions.

13. A voltage regulation system, comprising:
a voltage output circuit having upper and lower power switches, the voltage output circuit operable to provide a voltage output of a phase node coupled between the upper and lower power switches;

a low power signal module operable for detecting a mode select signal from a variable load element powered by the voltage output;

a load current compensation circuit coupled to the voltage output circuit and the low power signal module, the load current compensation circuit including, at least one comparator in operative communication with the low power signal module, the at least one comparator operable to compare the voltage output of the phase node with a zero reference level, and a reference voltage adjustment module operable to receive an output of the at least one comparator, the reference voltage adjustment module configured to provide a control signal, based on the output of the at least one comparator, to turn off at least one of the lower power switch and the upper power switch when the variable load element indicates a light load condition and the voltage output of the phase node is increasing from the zero reference level at a zero threshold crossing of negative inductor current for the voltage output circuit; and a controller operable to provide a control input to the voltage output circuit based at least in part on a feedback signal from the voltage output circuit;

wherein the load current compensation circuit provides load current compensation for the system based on a detected body diode conduction of at least one of the upper and lower power switches by incrementally adjusting a reference voltage level whereby the load current compensation stops after a predetermined number of operating cycles for the control input to the voltage output circuit.

14. The system of claim 13, wherein the load current compensation circuit is further operable to provide incremental adjustments of the reference voltage level until the body diode of at least one of the upper and lower power switches is no longer conducting and the inductor current of the voltage output circuit remains positive when the voltage output of the phase node is above the zero reference level after the predetermined number of operating cycles.

15. The system of claim 13, wherein the voltage output circuit comprises a low pass filter having an output node, wherein the output node of the low pass filter provides a voltage feedback signal to the controller.

16. The system of claim 13, wherein the low power signal module comprises a low power mode switch responsive to the mode select signal provided by the variable load element.

17. The system of claim 13, wherein the load current compensation circuit further comprises:
   a body diode comparator having a first input coupled to receive the phase node voltage level and the low power signal level and a second input coupled to receive a second fixed voltage level, the second fixed voltage level compared against the phase node voltage level in detecting the body diode conduction level of at least one of the upper and lower power switches; and
   a diode detection comparator operable to provide an output to the reference voltage adjustment module, the diode detection comparator having a first input coupled to receive a signal representative of a first fixed voltage level and a second input coupled to receive the phase node voltage level, the output of the diode detection comparator operable to indicate to the reference voltage adjustment module to terminate sensing of the body diode of at least one of the upper and lower power switches and suspend any further adjustments of the reference voltage if the phase node voltage level reaches the first fixed voltage level.

18. The system of claim 13, wherein the load current compensation circuit further comprises:
   a lower gate delay comparator operable to provide an output to the reference voltage adjustment module, the lower gate delay comparator having a first input coupled to receive at least a third fixed voltage level and a second input coupled to receive an output voltage level of the lower power switch, the lower gate delay comparator configured to compare the output voltage level against the third fixed voltage level based on a predetermined conduction time delay for the body diode of the lower power switch after the turning off a lower gate driver during the light load conditions.

19. An electronic system, comprising:
a varying load device having at least one power input; and
a power converter having at least one output coupled to the at least one power input of the varying load device, the power converter including,
   a load current compensation circuit coupled to the power converter, the load current compensation circuit configured to correct a reference voltage for at least one power switch of the power converter based on an indication of a light load condition from the varying load device;
   wherein the load current compensation circuit compensates for load currents experienced by the power converter by adjusting the reference voltage for the at least one power switch when the at least one power switch is turned off based at least in part on a body diode conduction level associated with the at least one power switch after the at least one power switch is turned off, and
   wherein the load current compensation circuit stops the load current compensation once the body diode is no longer conducting.

20. The system of claim 19, wherein the varying load device is a central processing unit having a mode select signal.

* * * * *